(12) United States Patent
Burmesch et al.

(10) Patent No.: US 8,607,600 B2
(45) Date of Patent: *Dec. 17, 2013

(54) PIN LOCKING DEVICE

(71) Applicant: Master Lock Company LLC, Oak Creek, WI (US)

(72) Inventors: Gary Burmesch, Port Washington, WI (US); D. Scott Kalous, Kenosha, WI (US); Dean Paulson, Oak Creek, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/627,567

(22) Filed: Sep. 26, 2012

(65) Prior Publication Data

US 2013/0019641 A1 Jan. 24, 2013

Related U.S. Application Data

(63) Continuation of application No. 12/546,140, filed on Aug. 24, 2009, now Pat. No. 8,302,435.

(60) Provisional application No. 61/091,542, filed on Aug. 25, 2008.

(51) Int. Cl.
*E05B 67/36* (2006.01)
*B60R 25/00* (2013.01)

(52) U.S. Cl.
USPC .................................. 70/34; 70/14; 70/258

(58) Field of Classification Search
USPC ......... 70/14, 18, 23, 26, 32, 33, 34, 38 R, 39, 70/53, 58, 124, 129, 258, 462
See application file for complete search history.

(56) References Cited

U.S. PATENT DOCUMENTS

| 1,495,115 A | 5/1924 | Setterburg |
| 1,592,696 A * | 7/1926 | Heyer ............................ 70/34 |

(Continued)

FOREIGN PATENT DOCUMENTS

| CN | 1502003 | 6/2004 |
| CN | ZL200720128940.4 | 7/2008 |

OTHER PUBLICATIONS

International Search Report and the Written Opinion from International Application No. PCT/US09/54857, mailed Nov. 9, 2009.

(Continued)

*Primary Examiner* — Christopher Boswell
(74) *Attorney, Agent, or Firm* — Calfee, Halter & Griswold LLP

(57) ABSTRACT

A locking device includes a shaft, a locking head joined to the shaft, and a lock body having a lock opening for receiving a locking end of the shaft. A latch member is disposed within the lock body and includes a shaft aperture for receiving the locking end of the shaft therethrough. The shaft aperture includes an edge portion spring biased radially inward of the lock opening to engage the recessed portion with the edge portion when the locking end of the shaft is disposed in the lock opening. A locking member is disposed within the lock body. Rotation of the locking member from a locked condition to an unlocked condition moves the edge portion of the shaft aperture out of engagement with the recessed portion of the shaft to permit withdrawal of the shaft from the lock opening.

13 Claims, 10 Drawing Sheets

(56) References Cited

U.S. PATENT DOCUMENTS

| | | | |
|---|---|---|---|
| 1,638,264 A | 8/1927 | Junkunc | |
| 4,003,227 A | 1/1977 | Casey | |
| 4,112,715 A | 9/1978 | Uyeda | |
| 4,236,395 A | 12/1980 | Avaiusini | |
| 4,576,021 A | 3/1986 | Holden | |
| 4,711,106 A | 12/1987 | Johnson | |
| D295,606 S | 5/1988 | Ault | |
| 4,989,892 A | 2/1991 | Kerins et al. | |
| 5,000,067 A | 3/1991 | Kolbusz et al. | |
| 5,119,649 A | 6/1992 | Spence | |
| 5,284,038 A | 2/1994 | Johnson | |
| 5,345,794 A | 9/1994 | Jenks | |
| D356,763 S | 3/1995 | Herrick | |
| 5,515,947 A * | 5/1996 | Shieh | 70/32 |
| 5,540,065 A | 7/1996 | Wyers | |
| 5,584,495 A | 12/1996 | Mason | |
| 5,638,710 A * | 6/1997 | Howard et al. | 70/14 |
| 5,664,445 A | 9/1997 | Chang | |
| 5,676,258 A | 10/1997 | Leyden et al. | |
| 5,682,775 A | 11/1997 | Baber | |
| 5,992,187 A | 11/1999 | Derman | |
| 5,992,193 A | 11/1999 | Bronk, III | |
| 6,055,832 A | 5/2000 | Wyers | |
| D428,795 S | 8/2000 | Wyers | |
| D439,827 S | 4/2001 | Wyers | |
| D444,050 S | 6/2001 | Wyers | |
| D445,667 S | 7/2001 | Johnson | |
| D447,043 S | 8/2001 | Wyers | |
| 6,334,561 B1 | 1/2002 | Cole | |
| 6,364,339 B1 | 4/2002 | Lee | |
| 6,402,181 B1 | 6/2002 | Lee | |
| 6,419,258 B1 | 7/2002 | Grote | |
| 6,425,272 B1 | 7/2002 | Chen | |
| D461,392 S | 8/2002 | Zapushek | |
| 6,427,496 B1 | 8/2002 | Hurst | |
| 6,457,336 B1 | 10/2002 | Bremicker | |
| 6,543,260 B2 | 4/2003 | Koy et al. | |
| 6,575,000 B1 | 6/2003 | Li | |
| 6,619,078 B1 | 9/2003 | Reese | |
| 6,644,071 B2 | 11/2003 | Gilbertson et al. | |
| D484,773 S | 1/2004 | Wyers | |
| 6,672,115 B2 | 1/2004 | Wyers | |
| 6,773,200 B2 | 8/2004 | Cole | |
| 6,789,405 B1 | 9/2004 | Mathers | |
| 6,796,154 B2 | 9/2004 | Gebow et al. | |
| 6,802,523 B1 | 10/2004 | Profitt | |
| 6,813,918 B2 | 11/2004 | Reese | |
| 6,862,905 B2 | 3/2005 | Zapushek | |
| 6,913,413 B2 | 7/2005 | Yang | |
| 6,932,376 B1 | 8/2005 | Profitt | |
| D511,292 S | 11/2005 | Hohmann et al. | |
| 6,962,066 B2 | 11/2005 | Larsen et al. | |
| 7,051,558 B2 | 5/2006 | Mathers | |
| D524,142 S | 7/2006 | Recknagel et al. | |
| 7,165,426 B2 | 1/2007 | Wyers | |
| 7,225,649 B2 | 6/2007 | Wyers | |
| D548,564 S | 8/2007 | Frantz | |
| 7,316,534 B2 | 1/2008 | Hohmann et al. | |
| 7,338,065 B1 | 3/2008 | Clausen | |
| 7,347,441 B2 | 3/2008 | Rosario | |
| D565,387 S | 4/2008 | Remark et al. | |
| 7,353,671 B2 | 4/2008 | Recknagel et al. | |
| 7,431,319 B2 | 10/2008 | Staggs | |
| 7,448,236 B2 | 11/2008 | Recknagel et al. | |
| D587,095 S | 2/2009 | Johnson | |
| D589,779 S | 4/2009 | Wrase et al. | |
| 7,530,590 B2 | 5/2009 | Staggs | |
| 7,568,718 B1 | 8/2009 | Thomas | |
| D605,927 S | 12/2009 | Wyers | |
| 7,698,916 B2 | 4/2010 | Davis | |
| 7,946,142 B2 * | 5/2011 | Matyko et al. | 70/34 |
| D646,951 S | 10/2011 | Tsai | |
| 8,061,730 B2 * | 11/2011 | Bernart | 70/39 |
| 8,302,435 B2 * | 11/2012 | Burmesch et al. | 70/34 |
| 2002/0104338 A1 | 8/2002 | Koy et al. | |
| 2002/0108407 A1 | 8/2002 | Zapushek | |
| 2004/0080141 A1 | 4/2004 | Hart | |
| 2004/0139777 A1 | 7/2004 | Waldrop | |
| 2007/0044523 A1 | 3/2007 | Davis | |
| 2007/0137266 A1 | 6/2007 | Hsai | |
| 2007/0180871 A1 | 8/2007 | Irgens et al. | |
| 2008/0178640 A1 | 7/2008 | Davis | |
| 2008/0196454 A1 | 8/2008 | Frantz | |

OTHER PUBLICATIONS

First Office Action from Chinese Patent Application No. 200980132956.4, dated Sep. 5, 2012.

* cited by examiner

PIN LOCKING DEVICE

CROSS-REFERENCE TO RELATED APPLICATION

This application is a continuation of U.S. Non-Provisional Patent Application Ser. No. 12/546,140, entitled PIN LOCKING DEVICE and filed on Aug. 24, 2009, which claims the benefit of U.S. Provisional Patent Application Ser. No. 61/091,542, entitled PIN LOCKING DEVICE and filed Aug. 25, 2008, the entire disclosures of both of which are incorporated herein by reference, to the extent that it is not conflicting with the present application.

BACKGROUND

A conventional pin lock or coupler lock lockably secures a lock housing to an end of a shaft, such that the shaft may be securely retained through one or more apertures, for example, to secure two or more apertured members together. As one example, a pin lock may lockably secure a trailer hitch within a receiver tube by inserting the shaft of the pin lock through aligned holes in the receiver tube and trailer hitch, and then locking the lock housing to the end of the shaft. The lock housing and an enlarged head on the opposite end of the shaft prevent withdrawal of the shaft in either direction.

SUMMARY

According to an inventive aspect of the present application, a locking arrangement includes a latch member disposed in a lock body, with the latch member being spring biased into radial engagement with a recessed portion of a shaft when the shaft is inserted in a lock opening of the lock body. The arrangement permits insertion of the shaft when the lock is in a locked condition, such that a locking member (e.g., a key operated cylinder plug) does not have to be manipulated by a user to lockingly engage the shaft within the lock body.

Accordingly, in one embodiment, a locking device includes a shaft, a locking head joined to the shaft, and a lock body having a lock opening for receiving a locking end of the shaft. A latch member is disposed within the lock body and includes a shaft aperture for receiving the locking end of the shaft therethrough. The shaft aperture includes an edge portion spring biased radially inward of the lock opening to engage the recessed portion with the edge portion when the locking end of the shaft is disposed in the lock opening. A locking mechanism is disposed within the lock body and includes a rotatable locking member. Rotation of the locking member from a locked condition to an unlocked condition moves the edge portion of the shaft aperture out of engagement with the recessed portion of the shaft to permit withdrawal of the shaft from the lock opening.

BRIEF DESCRIPTION OF THE DRAWINGS

Features and advantages of the invention will become apparent from the following detailed description made with reference to the accompanying drawings, wherein.

DETAILED DESCRIPTION

Figure 1:
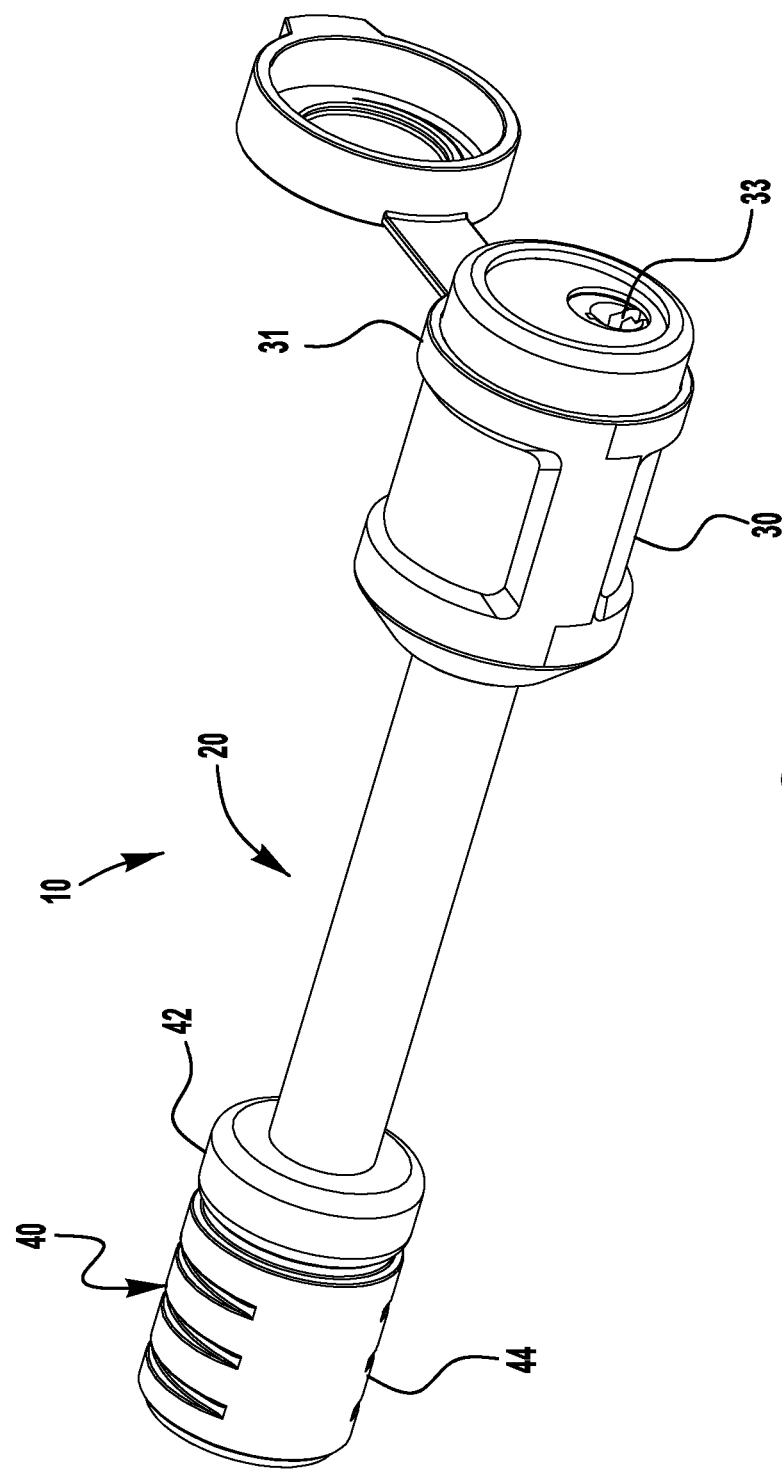
FIG. 1 illustrates a perspective view of a pin locking device.

This Detailed Description describes embodiments of the invention and is not intended to limit the scope of the claims in any way. Indeed, the invention as claimed is broader than and unlimited by the preferred embodiments, and the terms used in the claims have their full ordinary meaning.

The present application describes locking arrangements for locking an end of a shaft with a lock housing. While the embodiments described herein relate specifically to pin locks for use, for example, with trailer hitch receiver tubes, it is to be understood that inventive aspects of the present application may also be applied to other types of lock assemblies, including, for example, padlocks and cable locks.

In exemplary embodiments, the present application contemplates a pin locking device having a lock housing lockable to a first end of a shaft, with an enlarged head portion joined to a second end of the shaft, such that the shaft may be secured through one or more apertures (e.g., apertures in a trailer hitch receiver tube) when the lock housing is locked onto the shaft.

According to an inventive aspect of the present application, a pin lock may be configured to provide a spring-biased, snap-fit interlocking engagement between the shaft and the lock housing. In one embodiment, a spring-biased latch may be provided in the lock housing to interlock with a corresponding locking portion (e.g., a recessed portion, rib, or other such interlocking feature) of the shaft, to lockingly retain the end of the shaft within the lock housing. In one embodiment, a shaft may be provided with an end portion that is contoured, chamfered, or otherwise shaped to move the latch against a spring biasing force and out of a locked position during insertion of the shaft in the lock housing. When the spring biased latch becomes axially aligned with a recessed portion of the inserted shaft, the latch is configured to snap into interlocking engagement with this recessed portion, thereby locking the lock housing to the shaft. This snap-fit interlocking engagement upon insertion of the shaft may provide the user with an advantageous audible and/or tactile confirmation when the lock housing is fully installed onto the shaft in a locked condition.

To unlock the lock housing from the shaft, a locking mechanism within the lock housing may be configured to move the latch member against the spring biasing force and out of interlocking engagement with the recessed portion of the shaft, thereby allowing the shaft to be withdrawn from the lock housing. In one embodiment, the latch member includes a shaft aperture sized to permit withdrawal of the shaft when the shaft aperture is aligned with the shaft (i.e., upon operation of the locking mechanism), and to interlock with the recessed portion of the shaft when the shaft aperture is misaligned with the shaft (i.e., when spring biased against the recessed portion of the shaft).

Many different locking mechanisms may be utilized for operation of the latch member. In one embodiment, a locking member of a locking mechanism is rotatable to an unlocked condition to move the latch member against the spring biasing force and out of interlocking engagement with the recessed portion of the shaft. In one example, a locking mechanism may include a rotatable key operated cylinder plug. The rotatable locking member may extend parallel to the inserted shaft (as shown, for example, in the embodiment of FIGS. 1-6 herein), perpendicular to the inserted shaft (as shown, for example, in the embodiment of FIGS. 7-13 herein), or at some other orientation with respect to the shaft.

In one embodiment of the present application, a latch member disposed within a lock body is laterally spring biased toward a shaft engaging position, in which an edge portion of a shaft aperture in the latch member extends radially inward of a lock opening of the lock body for engagement with a recessed portion of a shaft inserted in the lock opening. The exemplary latch member is laterally slideable (for example, by rotation of a locking member, such as a key operated cylinder plug) to a shaft releasing position, in which the edge portion of the latch member disengages the recessed portion of the shaft to allow withdrawal of the shaft from the lock opening.

Figure 2:
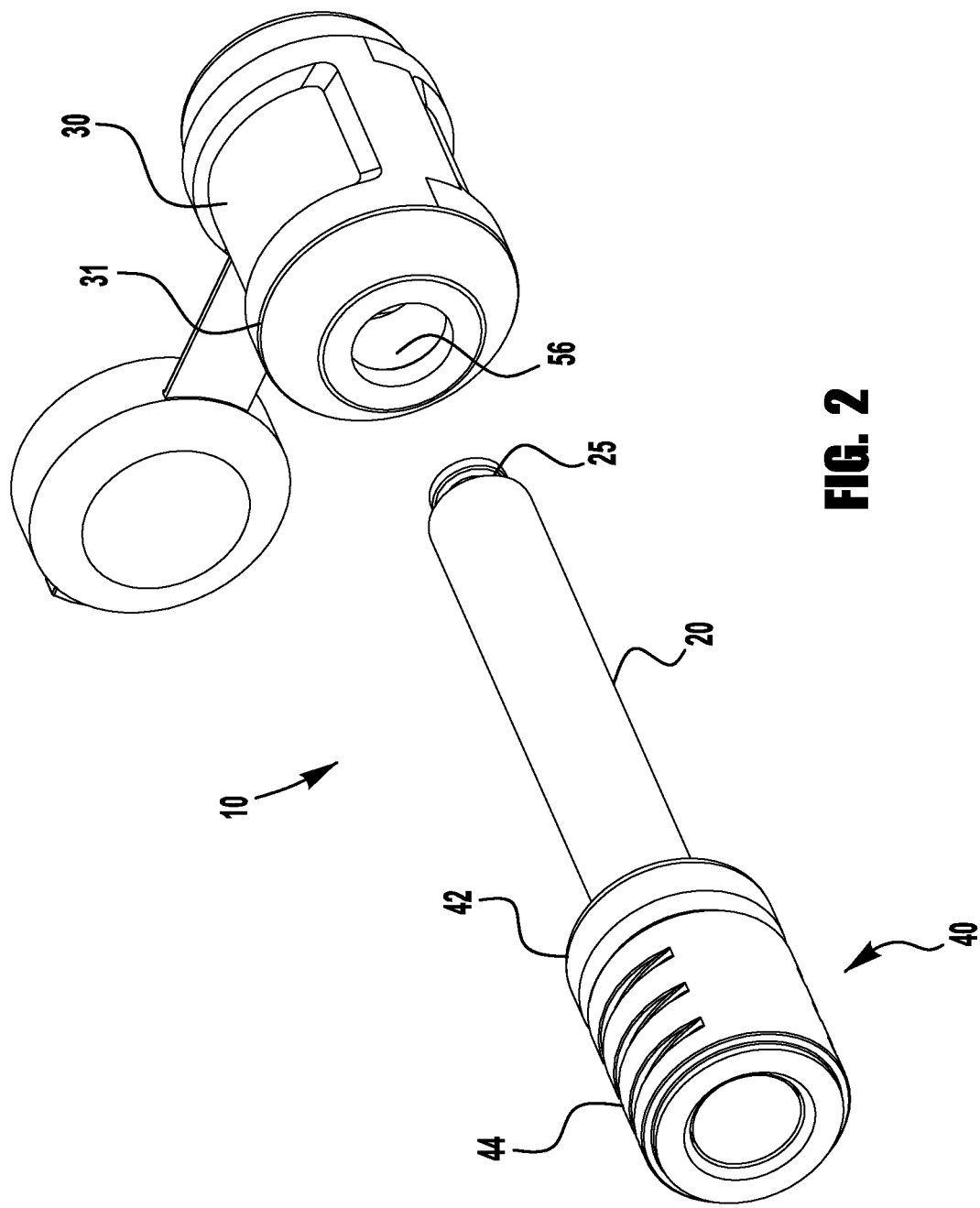
FIG. 2 illustrates a perspective view of the pin locking device of FIG. 1, shown with the shaft withdrawn from the lock housing.
Figure 3:
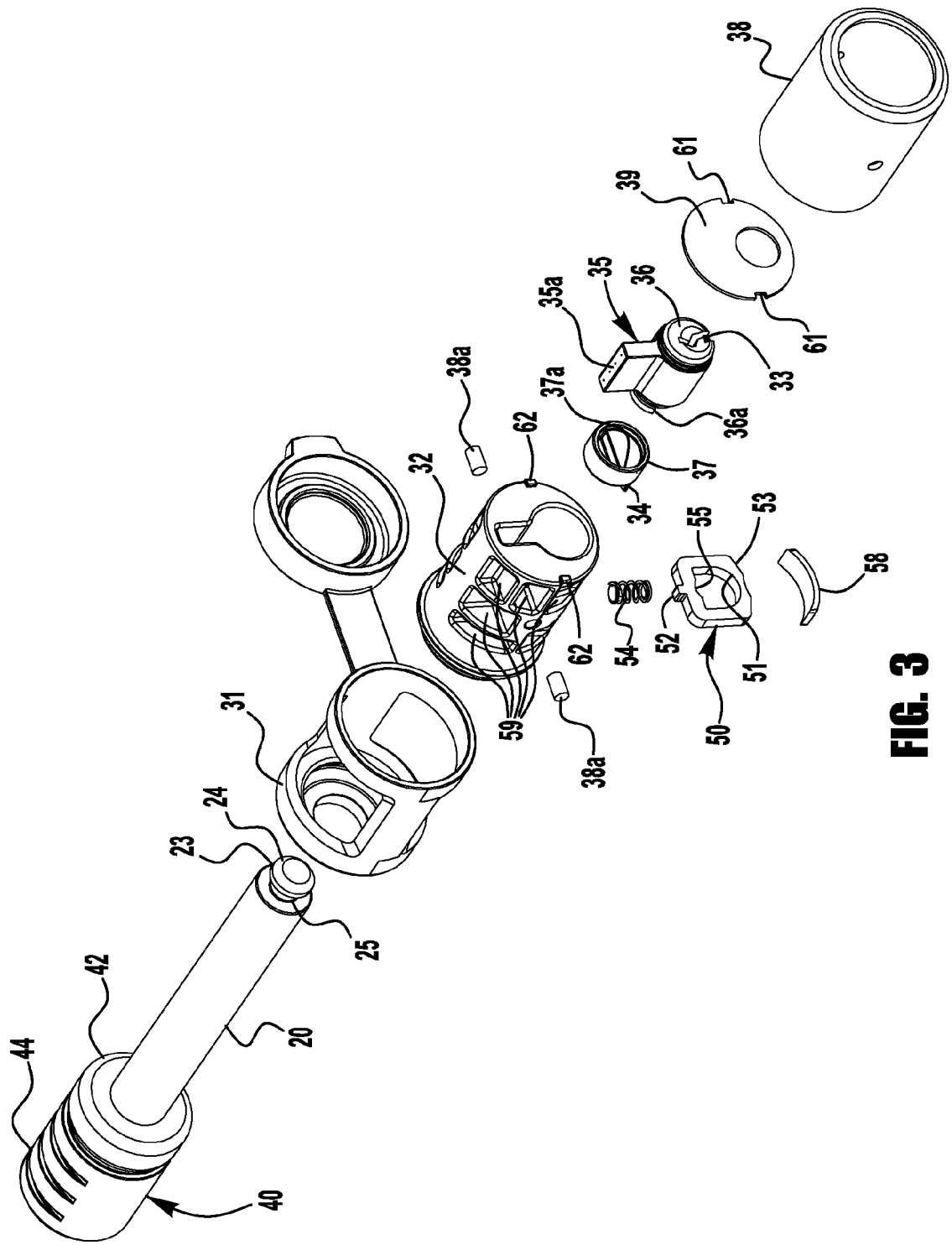
FIG. 3 illustrates an exploded perspective view of the pin locking device of FIG. 1.
Figure 4:
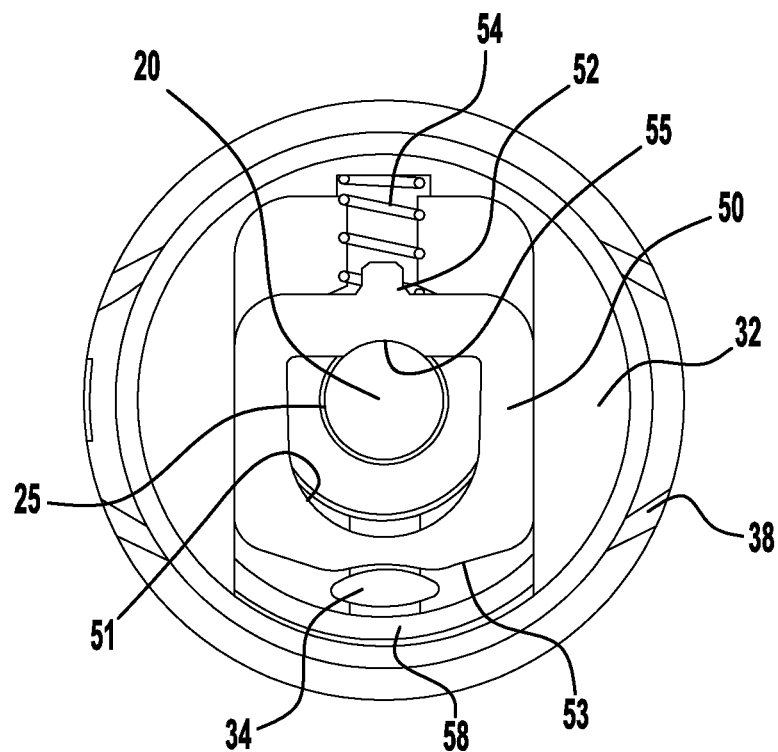
FIG. 4 illustrates a front cross-sectional view of the pin locking device of FIG. 1, shown in a locked condition.
Figure 5:
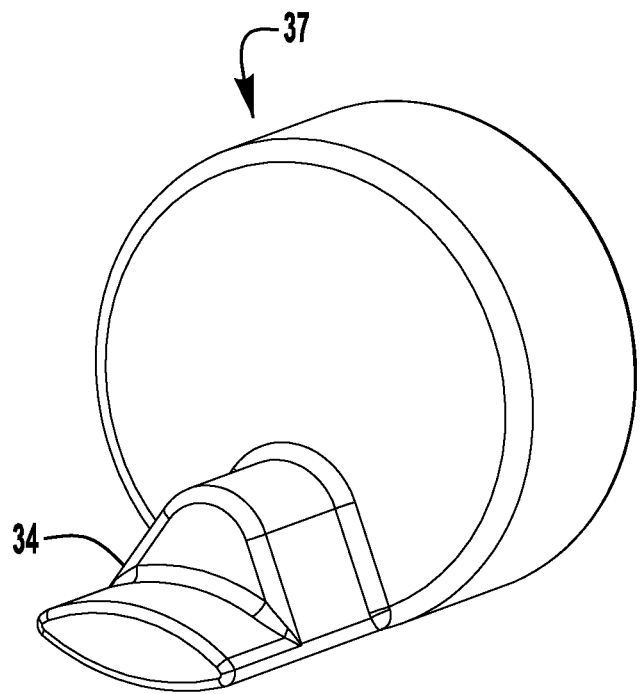
FIG. 5 illustrates a perspective view of a cam member of the pin locking device of FIG. 1.
Figure 6:
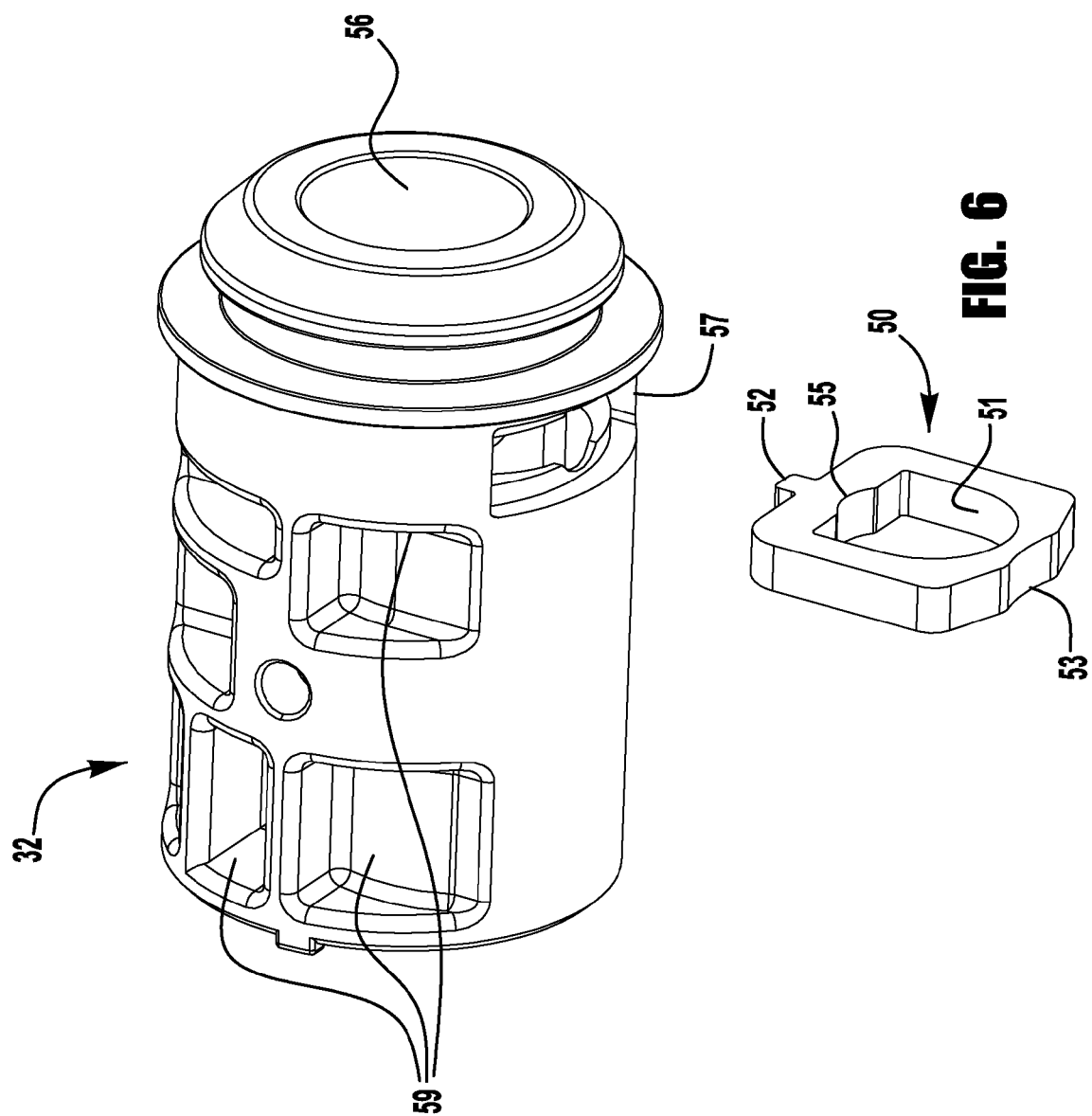
FIG. 6 illustrates an exploded lower side perspective view of the lock body and latch member of the pin locking device of FIG. 1.

FIGS. 1-6 illustrate various views of an exemplary pin lock 10 having a shaft portion 20, a lock housing 30 lockable to a first end or locking end of the shaft portion 20, and an enlarged head portion 40 joined to a second end of the shaft portion 20. As shown in FIGS. 1-3, a bumper/keyway cover 31, as known in the art, may be assembled with the housing 30, for example, to protect the housing and to prevent contaminants from entering the keyway 33 (or other lock interface, such as a combination dial). The head portion 40 may, but need not, be integral with the shaft portion 20. In the illustrated embodiment, an annular flange 42 is integral with the shaft portion 20, and is configured to receive a press fit plastic bushing 44. The end of the shaft portion 20 receiving the bushing 44 may be knurled to better grip the bushing 44.

The lock housing of the inventive pin lock may be provided in many different configurations and types of assemblies, and may be provided with many different types of locking mechanisms, including, for example, combination lock mechanisms and key-operated locks. As shown in the exploded view of FIG. 3, the exemplary pin lock housing 30 includes a lock body 32 which retains a locking mechanism 35 (e.g., a key operated lock cylinder) and includes a lock opening 56 (FIG. 2) sized to receive the locking end of the shaft portion 20. A keystop plate 39 and housing casing 38 are secured over the lock body 32 (e.g., by pins 38a, or by roll forming) to securely enclose the locking mechanism 35 and the other internal lock components. The keystop plate 39 may be rotationally aligned with the lock body 32 by corresponding notches 61 and nubs 62 on the plate 39 and lock body 32. The lock body 32 may include outer recesses 59, for example, to reduce material costs and/or weight of the lock.

Many different mechanisms may be utilized to engage and operate a movable latch with a lock housing. In one embodiment, a cam member may be rotated by operation of the locking mechanism (e.g., by rotating a key cylinder plug), such that a latch engaging portion (e.g., a finger or other such projection) of the cam moves the latch against a spring (or other such biasing member) to disengage the latch from a corresponding locking portion of the shaft, thereby allowing the shaft to be withdrawn from the lock housing. In the illustrated embodiment, the locking mechanism 35 includes a locking member or key operated cylinder plug 36 that is rotatable within shell 35a (see FIG. 3) upon insertion of an authorized key in the keyway 33 (for example, using a conventional pin tumbler locking mechanism). The exemplary plug 36 includes a keyed end portion 36a, which is received in a complementary shaped keyed portion 37a of a rotatable cam member 37 for rotation with the plug 36. The cam member 37 include a projection or finger 34 (see FIG. 5) that engages a spring loaded latch member 50 disposed in the lock body 32.

A latch may be configured for many different types of biased movement into interlocking engagement with the shaft, including, for example, pivoting movement, rotational movement, axial sliding movement (along the axis of the shaft), or radial sliding movement (towards or away from the center line of the shaft). In an exemplary embodiment, a latch member is radially slideable into interlocking engagement with an outer circumferential recess on the shaft, and is spring biased towards interlocking engagement with the shaft recess. The exemplary latch member 50 includes a shaft aperture 51 for receiving an end portion 23 of the shaft 20 therethrough, an upper spring-engaging surface 52, which engages a biasing spring 54, and a lower cam engaging surface 53, which engages the cam finger 34. The illustrated latch member 50 is installed in the lock body 32 through a slot 57 in the lock body 32 (see FIG. 6). To provide additional protection from unauthorized access to the latch member 50, a shield member 58 may be installed in the slot 57 (and retained in the slot by the casing 38).

When the cam member 37 is rotated (by rotating the key cylinder plug 36) to an unlocking position, the cam finger 34 moves the latch member 50 from the locking position to the unlocking position, in which the shaft aperture 51 aligns with the end portion 23 of the shaft 20 to allow withdrawal of the locking end portion 23 from the lock opening 56 in the lock body 32. The shaft aperture may be provided in any suitable shape that allows withdrawal of the shaft when the shaft aperture is aligned with the shaft (e.g., notch, slot, hole, or other cutout). In the illustrated embodiment, the shaft aperture 51 is provided as a hole in the latch member 50, which allows the inserted shaft to be substantially collinear with the axis of rotation of the plug 36 and cam member 37, which may allow the size of the lock housing to be minimized. While the cam member 37 may be configured to move the latch member 50 to the unlocking position when rotated in one direction (clockwise or counterclockwise), the locking mechanism and cam member 37 may instead be configured to move the latch when rotated in either direction. In one such embodiment, the cam finger 34 may be positioned directly below the cam engaging surface 53 of the latch member 50 when the locking mechanism 35 is in the locked condition (FIG. 4), such that rotation of the cam member 37 in either direction causes the cam finger 34 to engage a side of the cam engaging surface 53 to lift the latch member 50.

When the inserted key is released, the biasing spring 54 pushes the latch member 50 back to the locking position, which in turn rotates the cam member 37 and plug 36 back to the locked orientation for removal of the key. When the end portion 23 of the shaft 20 is reinserted in the lock body opening 56, a tapered or chamfered surface 24 on the locking end portion 23 of the shaft 20 (see FIG. 3) engages an edge portion 55 of the shaft aperture 51, and applies a radial force to the latch member 50 to move the latch member to the unlocking position. In another embodiment (not shown), the edge portion of the shaft aperture may additionally or alternatively be tapered to facilitate radial movement of the latch member upon insertion of the shaft. When the latch member 50 is axially aligned with the recessed portion 25 of the shaft 20, the biasing spring 54 pushes the latch member 50 into interlocking engagement with the recessed portion 25 (see FIG. 3), such that the shaft aperture 51 is out of alignment with the locking end portion 23 of the shaft 20 and the edge portion 55 of the shaft aperture 51 is received in the recessed portion 25 of the shaft 20, thereby securely retaining the locking end portion 23 in the lock housing 30. As mentioned above, a snapping, spring biased engagement of the latch member 50 with the recessed portion 25 may provide an audible (e.g., clicking sound) and/or tactile confirmation to the user that interlocking engagement has been achieved.

In another embodiment of the present application, a latch member disposed within a lock body is rotationally spring biased toward a shaft engaging position, in which an edge portion of a shaft aperture in the latch member extends radially inward of a lock opening of the lock body for engagement with a recessed portion of a shaft inserted in the lock opening. The latch member is rotatable (for example, by rotation of a key operated cylinder plug) to a shaft releasing position, in which the edge portion of the latch member disengages the recessed portion of the shaft to allow withdrawal of the shaft from the lock opening.

Figure 7:
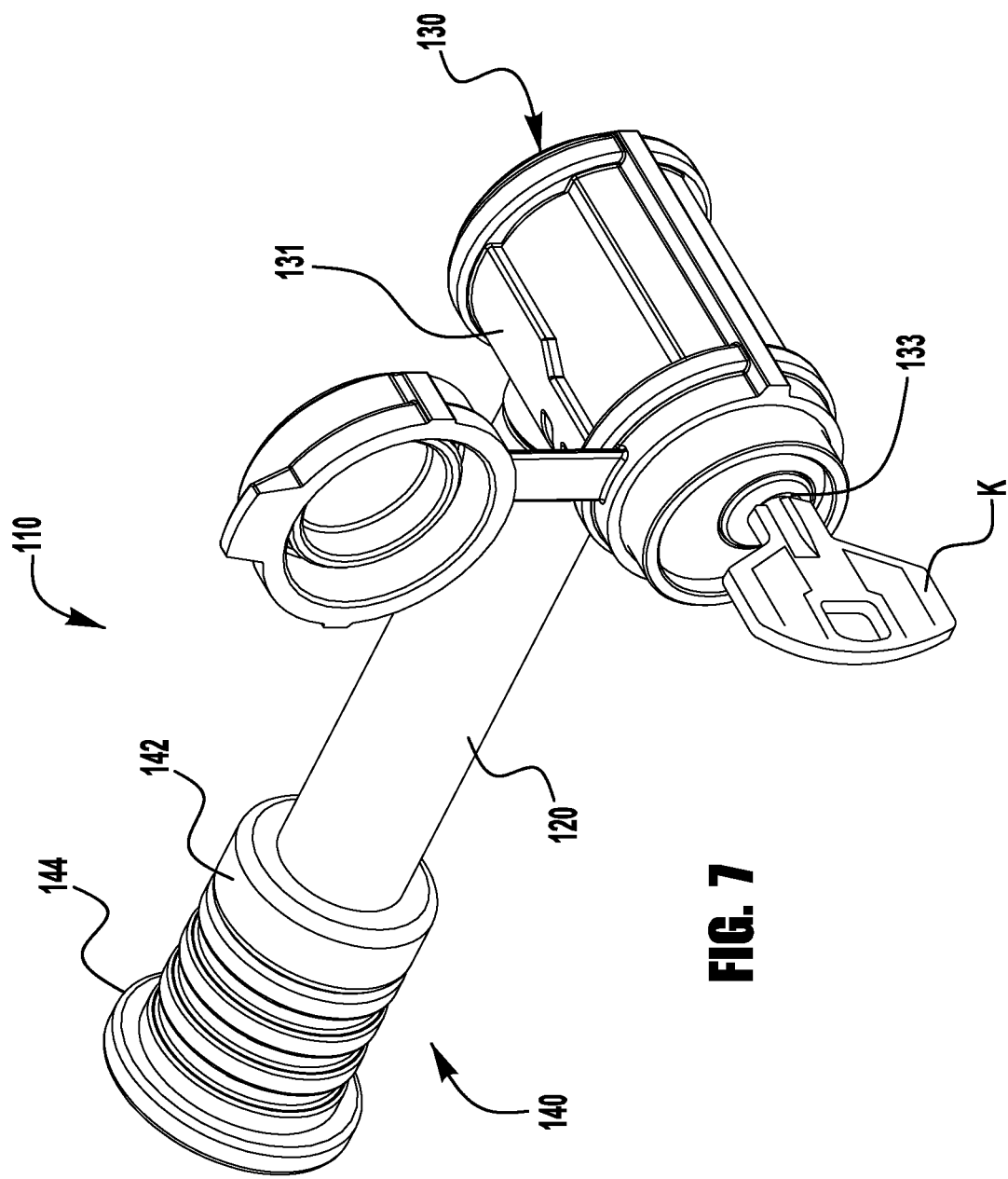
FIG. 7 illustrates a perspective view of another pin locking device.
Figure 8:
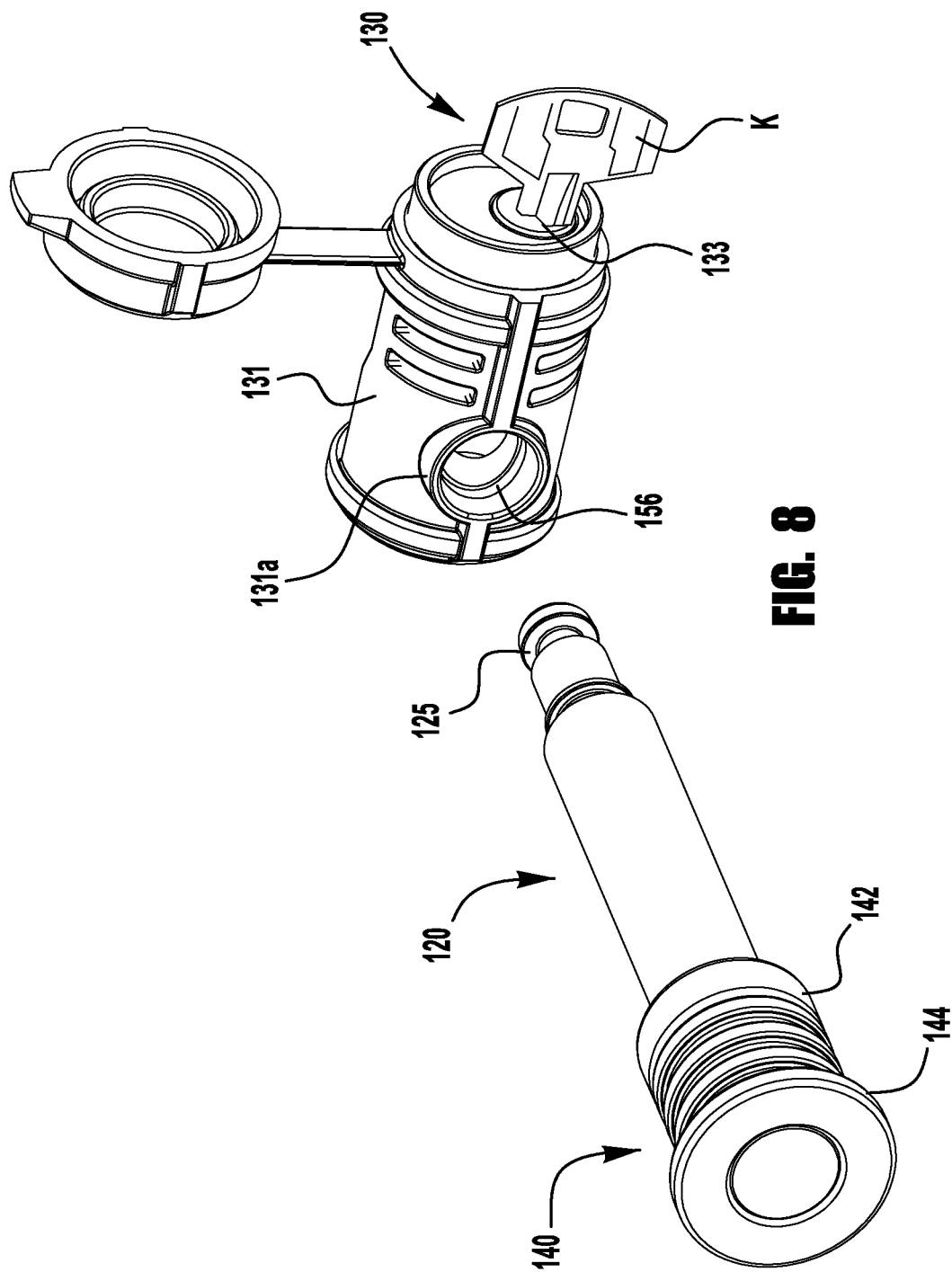
FIG. 8 illustrates a perspective view of the pin locking device of FIG. 7, shown with the shaft withdrawn from the lock housing.
Figure 9:
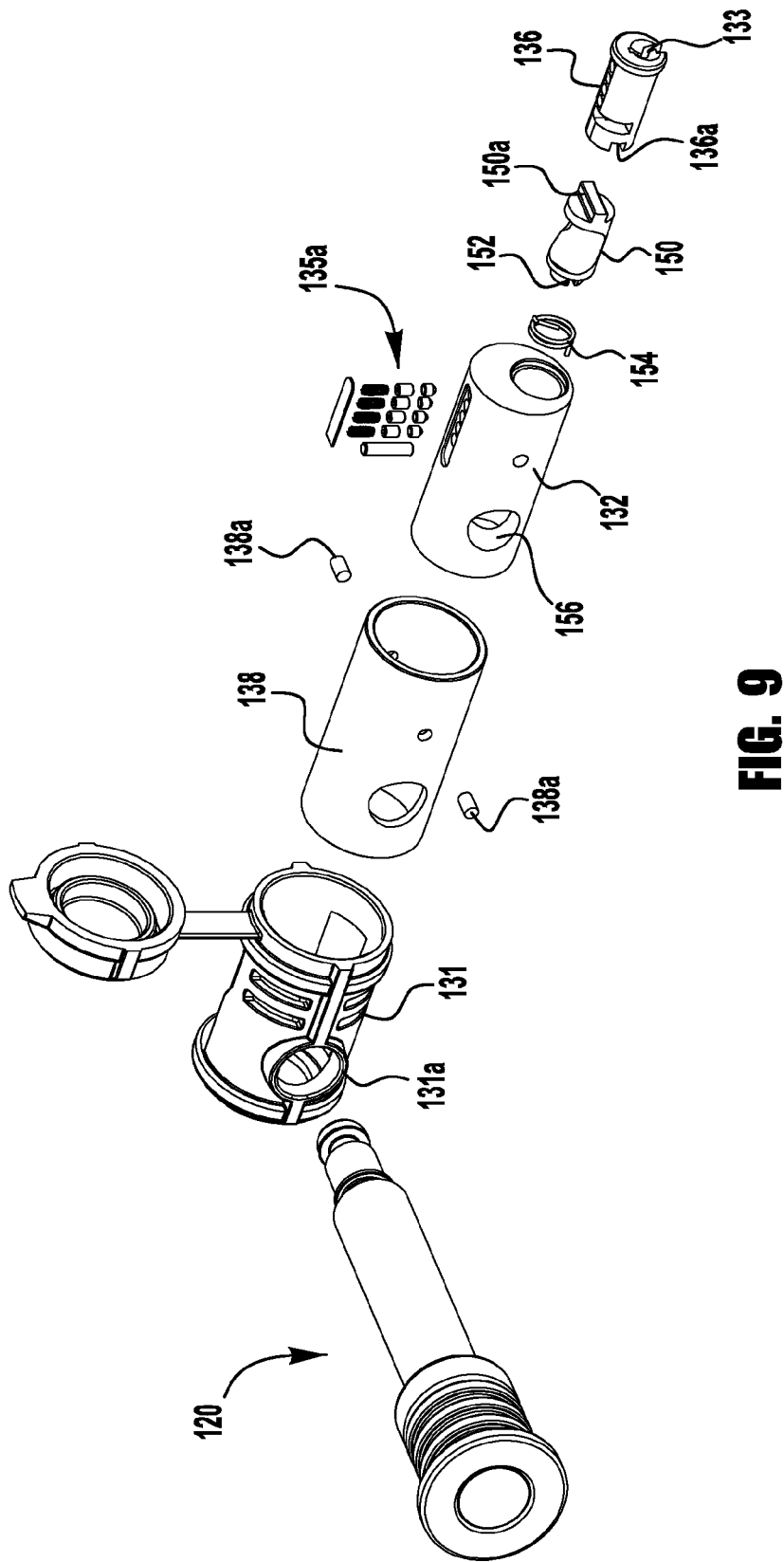
FIG. 9 illustrates an exploded perspective view of the pin locking device of FIG. 7.
Figure 10:
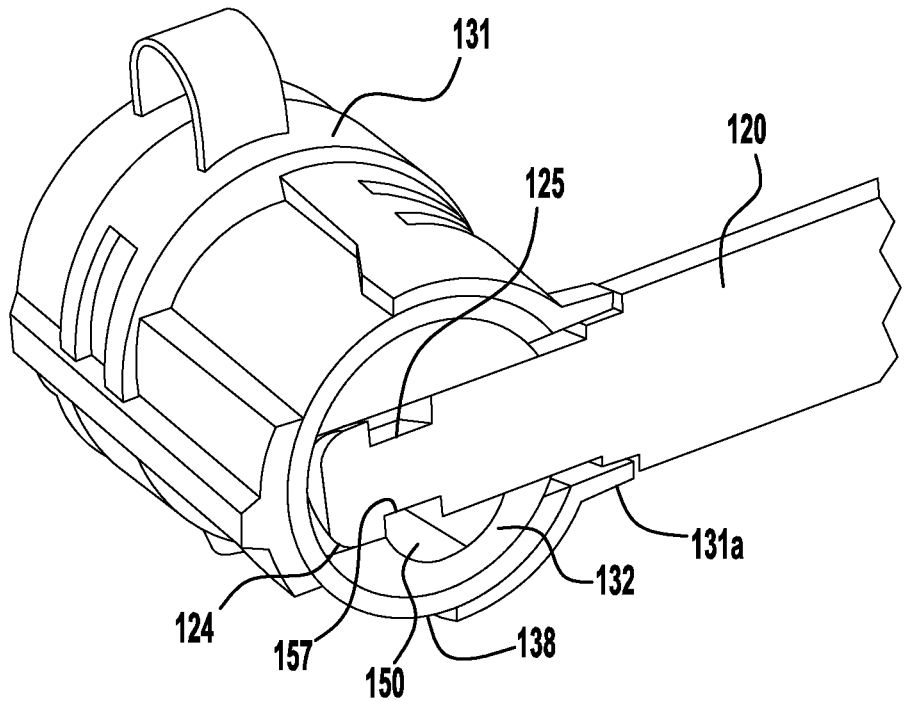
FIG. 10 illustrates a cross-sectional view of the pin locking device of FIG. 7, taken along a plane perpendicular to a longitudinal axis of the lock housing.
Figure 11:
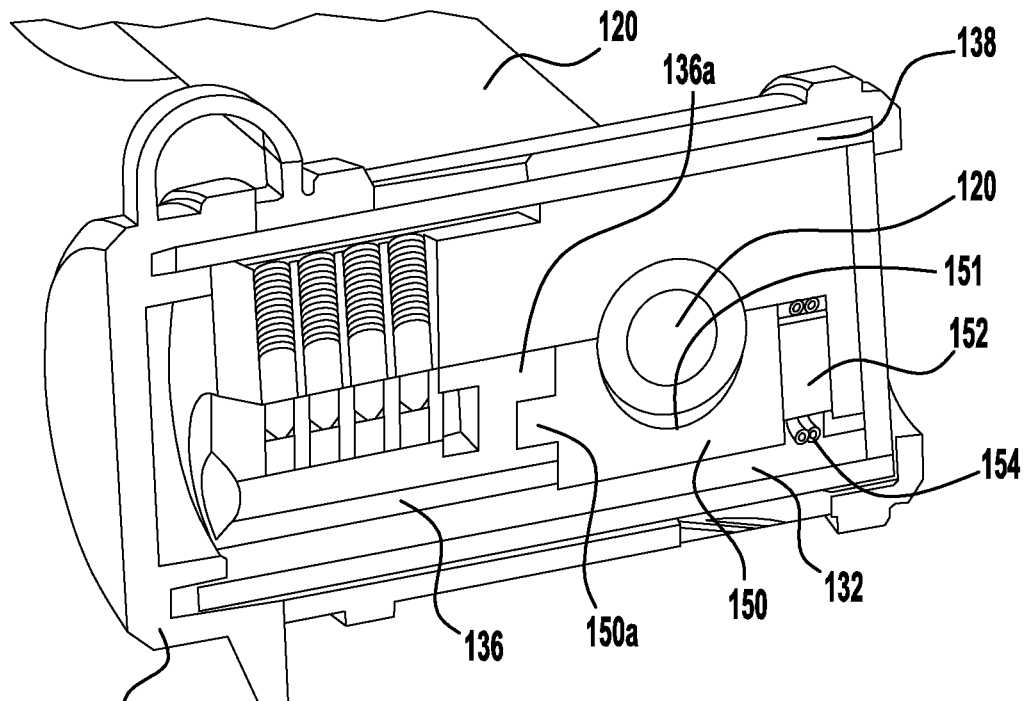
FIG. 11 illustrates a cross-sectional view of the pin locking device of FIG. 7, taken along a plane perpendicular to a longitudinal axis of the shaft.
Figure 12:
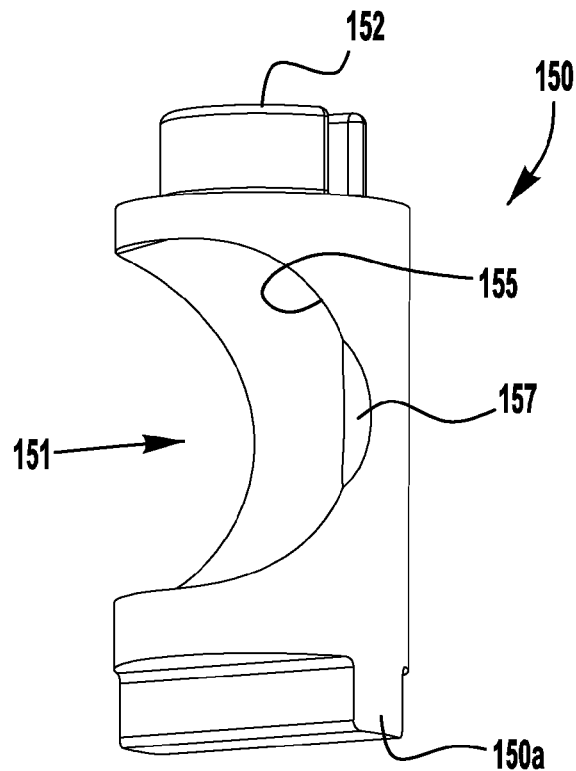
FIG. 12 illustrates a perspective view of the cam member of the pin locking device of FIG. 7.
Figure 13:
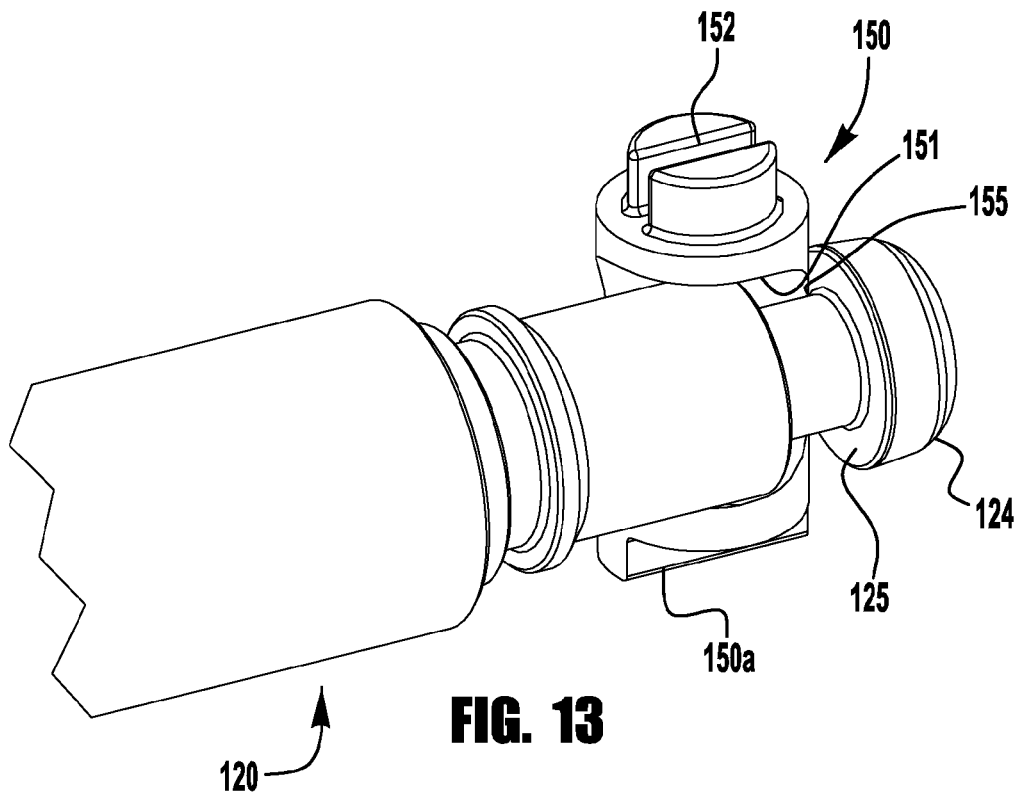
FIG. 13 illustrates a partial perspective view of the cam member and shaft portion of the pin locking device of FIG. 7.

FIGS. 6-11 illustrate various views of an exemplary pin lock 110 having a shaft portion 120, a lock housing 130 with a lock opening 156 for receiving the shaft portion 120 with the lock housing being lockable to a first end or locking end of the shaft portion 120, and an enlarged head portion 140 joined to a second end of the shaft portion 120. As shown in FIGS. 7-9, a bumper/keyway cover 131, as known in the art, may be assembled with the housing 130, for example, to protect the housing and to prevent contaminants from entering the keyway 133 (or other lock interface, such as a combination dial). As shown in FIG. 10, the bumper/keyway cover 131 may additionally include a known sealing ring 131a for providing a seal between the inserted shaft 120 and the lock opening 156, as known in the art. Still other types of known, conventional seals, separate from a bumper/keyway cover, may be utilized, including, for example, O-ring seals and gaskets internal or external to the housing 130 (not shown). The head portion 140 may, but need not, be integral with the shaft portion 120. In the illustrated embodiment, an annular flange 142 is integral with the shaft portion 120, and is configured to receive a press fit plastic bushing 144. The end of the shaft portion 120 receiving the bushing 144 may be knurled to better grip the bushing 144.

The lock housing of the inventive pin lock may be provided in many different configurations and types of assemblies, and may be provided with many different types of locking mechanisms, including, for example, combination lock mechanisms and key-operated locks. As shown in the exploded view of FIG. 9, the exemplary pin lock housing 130 includes a lock body 132 defining the lock opening 156 for insertion of a locking end of the shaft 120.

Many different mechanisms may be utilized to engage and operate a movable latch with a lock housing. In one embodiment, a latch member may be rotated by operation of the locking mechanism (e.g., by rotating a key cylinder plug), such that the latch member rotates against a spring (or other such biasing member) to disengage the a shaft engaging portion of the latch from a corresponding locking portion of the shaft, thereby allowing the shaft to be withdrawn from the lock housing. In the illustrated embodiment, the locking mechanism 135 includes a locking member or key operated cylinder plug 136 that is rotatable upon insertion of an authorized key K in the keyway 133 (for example, using a conventional pin tumbler locking mechanism, shown generally at 135a in FIG. 9). The pin tumbler locking mechanism 135a is retained within the lock body 132 by a lock casing 138 secured to the lock body 132, for example, by pins 138a staked through aligned openings in the in the lock body 132 and lock casing 138. While the plug 136 and pin tumbler locking mechanism 135a are assembled directly into the lock body 132 of the illustrated embodiment, in another embodiment (not shown), the plug and locking components may be provided in a conventional lock cylinder shell (e.g., the shell 35a of the embodiment of FIGS. 1-6) for installation in the lock body. The exemplary plug 136 includes a keyed end portion 136a, which interlocks with a complementary shaped keyed end portion 150a in a rotatable latch member 150 disposed within the lock body 132.

As discussed above, a latch may be configured for many different types of biased movement into interlocking engagement with the shaft. In an exemplary embodiment, a latch member is rotatable into interlocking engagement with an outer circumferential recess on the shaft, and is spring biased towards interlocking engagement with the shaft recess. The exemplary latch member 150 includes a shaft aperture 151 for receiving a locking end portion 123 of the shaft 120 therethrough, a spring-engaging portion 152 (opposite the keyed end portion 150a), which engages a biasing spring 154. When the latch member 150 is rotated (by rotating the key cylinder plug 136) to an unlocking position, the shaft aperture 151 aligns with the locking end portion 123 of the shaft 120 (i.e., an edge portion 155 of the shaft aperture 151 disengages from the recessed portion of the shaft 120) to allow withdrawal of the locking end portion 123 from the lock opening 156 in the lock body 132 (see FIG. 5).

When the inserted key K is released, the biasing spring 154 rotates the latch member 150 and plug 136 back to the locking position for removal of the key. When the end portion 123 of the shaft 120 is reinserted in the lock body opening 156, a tapered or chamfered surface 124 on the end portion 123 (see FIG. 7) engages an edge portion 155 of the shaft aperture 151, and applies a rotational force to the latch member 150 to move the latch member to the unlocking position. When the edge portion 155 of the latch member 150 is axially aligned with the recessed portion 125 of the inserted shaft 120, the biasing spring 154 rotates the latch member 150 into interlocking engagement with the recessed portion 125 (see FIG. 10), such that the shaft aperture 151 is out of alignment with the locking end portion 123 of the shaft 120 and the edge portion 155 of the shaft aperture 151 is received in the recessed portion 125 of the shaft, thereby securely retaining the locking end portion 123 in the lock housing 130. While the shaft aperture 151 may be provided in any suitable shape, in the illustrated embodiment, the shaft aperture 151 is formed as an arcuate notch in the cylindrical latch member 150 (see FIG. 12). As shown, the edge portion 155 of the shaft aperture 151 may be provided with a scalloped edge 157 positioned to provide increased engagement between the latch member 150 and the recessed portion 125, as shown in FIG. 10. As mentioned above, a snapping, spring biased engagement of the latch member 150 with the recessed portion 125 may provide an audible (e.g., clicking sound) and/or tactile confirmation to the user that interlocking engagement has been achieved.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A locking device comprising:
   a shaft having a first end, a second end, and a recessed portion between the first end and the second end;
   a locking head joined to the second end of the shaft, the locking head extending radially outward from the shaft;
   a lock body having a lock opening for receiving the first end of the shaft;
   a latch member disposed within the lock body and including an arcuate notch defining an arcuate edge portion spring biased radially inward of the lock opening to permit insertion of the first end of the shaft against the arcuate edge portion and past the latch member, and to engage the recessed portion of the shaft with the arcuate edge portion; and
   a locking mechanism disposed within the lock body, the locking mechanism including a locking member rotatable about a locking member axis between a locked condition and an unlocked condition, the locking member axis being substantially perpendicular to the shaft when the shaft is inserted in the lock opening;
   wherein rotation of the locking member from the locked condition to the unlocked condition rotates the latch member about the locking member axis to move the arcuate edge portion of the latch member out of engagement with the recessed portion of the shaft to permit withdrawal of the first end of the shaft from the lock opening.

2. The locking device of claim 1, wherein the arcuate edge portion is rotationally spring biased radially inward of the lock opening.

3. The locking device of claim 1, wherein the latch member is rotatable with the locking member for movement of the arcuate edge portion out of engagement with the recessed portion of the shaft when the locking member is rotated to the unlocked condition.

4. The locking device of claim 1, wherein the first end of the shaft comprises a chamfered end surface contoured to force the arcuate edge portion of the latch member radially outward against spring biasing when the first end of the shaft is inserted into the lock opening.

5. The locking device of claim 1, wherein the arcuate edge portion comprises a scalloped edge configured to increase surface engagement between the arcuate edge portion and the recessed portion.

6. The locking device of claim 1, wherein the locking member comprises a key operated cylinder plug disposed within the lock body and including an end portion engaging a first end portion of the latch member for rotation of the latch member between the locking and unlocking positions upon insertion of an authorized key.

7. The locking device of claim 6, further comprising a biasing spring connected with a second end portion of the latch member opposite the first end portion and rotationally biasing the latch member toward the locking position, the biasing spring being configured to permit rotation of the latch member toward the unlocking position when the first end of the shaft is inserted into the lock opening and against the arcuate edge portion, the biasing spring returning the latch member to the locking position when the recessed portion of the shaft is aligned with the arcuate edge portion.

8. The locking device of claim 7, wherein the first and second end portions of the latch member are cylindrical.

9. The locking device of claim 6 wherein the first end portion of the latch member is rotationally fixed to the end portion of the key operated cylinder plug.

10. A method of locking and unlocking a shaft with a lock body, the method comprising:
    inserting a first end of the shaft into a lock opening in the lock body;
    engaging an arcuate notch of a latch member with the first end of the shaft to move the arcuate notch radially outward against a spring biasing force to insert the first end of the shaft past the latch member;
    aligning a recessed portion of the shaft with the arcuate notch of the latch member, such that the arcuate notch is spring biased into locking engagement with the recessed portion;
    rotating a locking member disposed within the lock body about a locking member axis from a locked condition to an unlocked condition to rotate the latch member about the locking member axis and against the spring biasing force and disengage the arcuate notch from the recessed portion, the locking member axis being substantially perpendicular to the shaft; and
    withdrawing the first end of the shaft from the lock opening.

11. The method of claim 10, wherein engaging the arcuate notch of the latch member with the first end of the shaft to move the arcuate notch radially outward against the spring biasing force comprises rotating the latch member.

12. The method of claim 10, wherein the locking member is in the locked condition when the first end of the shaft is inserted into the lock opening.

13. A locking device comprising:
- a shaft having a first end, a second end, and a recessed portion between the first end and the second end;
- a locking head joined to the second end of the shaft, the locking head extending radially outward from the shaft;
- a lock body having a lock opening for receiving the first end of the shaft;
- a latch member disposed within the lock body and including an arcuate notch disposed between first and second cylindrical end portions rotationally spring biased radially inward of the lock opening to permit insertion of the first end of the shaft against the arcuate notch and past the latch member, and to engage the recessed portion of the shaft with the arcuate notch;
- a key cylinder lock disposed within the lock body and including a key operated cylinder plug rotationally fixed to a cylindrical first end portion of the latch member, and rotatable about a central axis between a locked condition and an unlocked condition, the central axis being substantially perpendicular to the shaft when the shaft is inserted in the lock opening; and
- a biasing spring connected with a second end portion of the latch member opposite the first end portion and rotationally biasing the latch member toward the locking position, the biasing spring being configured to permit rotation of the latch member toward the unlocking position when the first end of the shaft is inserted into the lock opening and against the arcuate arcuate notch, the biasing spring returning the latch member to the locking position when the recessed portion of the shaft is aligned with the arcuate notch;
- wherein rotation of the key operated cylinder plug from the locked condition to the unlocked condition rotates the latch member about the central axis to move the arcuate notch out of engagement with the recessed portion of the shaft to permit withdrawal of the-first end of the shaft from the lock opening.

* * * * *